(12) United States Patent
Sakai et al.

(10) Patent No.: US 7,502,450 B2
(45) Date of Patent: Mar. 10, 2009

(54) COMMUNICATION APPARATUS

(75) Inventors: Mituyuki Sakai, Overland Park, KS (US); Kiyoshi Okada, Shijonawate (JP); Nobuhiro Hosohara, Amagasaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 244 days.

(21) Appl. No.: 10/282,366

(22) Filed: Oct. 29, 2002

(65) Prior Publication Data

US 2003/0100295 A1  May 29, 2003

(30) Foreign Application Priority Data

Oct. 30, 2001  (JP) .............................. 2001-333103

(51) Int. Cl.
*H04M 11/00* (2006.01)
(52) U.S. Cl. .............................. 379/93.35; 379/142.06; 379/164; 455/414.1; 370/252; 370/259
(58) Field of Classification Search ............ 379/142.02, 379/142.06, 93.35, 164; 455/412, 414, 415, 455/412.2, 414.1, 405, 426.1, 528, 567, 556.2, 455/566, 517, 401, 158.5; 370/259, 252
See application file for complete search history.

(56) References Cited

U.S. PATENT DOCUMENTS

| | | | |
|---|---|---|---|
| 5,604,791 A * | 2/1997 | Lee | 379/88.21 |
| 5,644,629 A * | 7/1997 | Chow | 379/142.07 |
| 5,883,942 A * | 3/1999 | Lim et al. | 379/142.01 |
| 6,118,859 A * | 9/2000 | Giethoorn | 379/142.06 |
| 6,415,164 B1 * | 7/2002 | Blanchard et al. | 455/566 |
| 6,438,392 B1 * | 8/2002 | Toba | 455/567 |
| 6,516,202 B1 * | 2/2003 | Hawkins et al. | 455/556.2 |
| 6,674,725 B2 * | 1/2004 | Nabkel et al. | 370/252 |
| 6,711,239 B1 * | 3/2004 | Borland | 379/67.1 |
| 2003/0153337 A1 * | 8/2003 | Ito | 455/517 |

FOREIGN PATENT DOCUMENTS

| | | |
|---|---|---|
| CN | 2444354 Y | 8/2001 |
| DE | 1069791 A1 * | 1/2001 |
| JP | 10-327232 | 12/1998 |
| JP | 2000253373 | 9/2000 |
| KR | 2001-0058785 | 7/2001 |

* cited by examiner

*Primary Examiner*—Md S Elahee

(57) ABSTRACT

Conventionally, when a mobile phone receives an incoming call and no response is made to the call, the user can only recognize the name or phone number of a caller, plus the incoming time, by the incoming call history list. Also, if no response is made to an incoming call in the call waiting function, the user cannot identify the caller later. The present communication apparatus displays an image of a caller of an incoming call to which no response has been made after reception of the incoming call ends. This makes it possible for the user to identify the caller by the image. Further, the present communication apparatus displays an image of a caller of an incoming call in the call waiting function after the conversation ends. This enables the user to identify the caller later.

1 Claim, 11 Drawing Sheets

| REFERENCE NO. | NAME | PHONE NUMBER | IMAGE DATA |
|---|---|---|---|
| 1 | Mark Green | 111-111-1111 | MG |
| 2 | Sue Thompson | 222-222-2222 | ST |
| 3 | Jill Morgan | 333-333-3333 | JM |
| 4 | Jean Everett | 444-444-4444 | JE |

FIG. 5

| REFERENCE NO. | INCOMING TIME | PHONE NUMBER |
|---|---|---|
| 1 | 17:01, 4th April 2001 | 111-111-1111 |
| 2 | 14:21, 3rd March 2001 | 222-222-2222 |
| 3 | 13:51, 2nd February 2001 | 333-333-3333 |
| 4 | 10:10, 1st January 2001 | 444-444-4444 |

INCOMING CALLS LIST

COMMUNICATION APPARATUS

BACKGROUND OF THE INVENTION (1) Field of the Invention

The present invention relates to a technique for notifying a communication apparatus of an incoming call.

(2) Description of the Related Art

First, a conventional mobile phone will be described in terms of its appearance. As shown in FIG. 9, the conventional mobile phone is composed of a display unit 9 and an operation unit 10. The operation unit 10 includes ten keys, a talk key 13 used to have conversation with a caller, a power key 14, and a menu key 12 for setting various functions.

FIG. 10 is a block diagram showing the construction of the conventional mobile phone. As shown in FIG. 10, the conventional mobile phone is composed of an antenna 1 for transmitting and receiving radio signals, a duplexer 2 for switching between transmission and reception, a reception unit 3 for demodulating reception signals, a transmission unit 4 for modulating transmission signals, an operation unit 10 with which users instruct operations, a display unit 9 which displays messages or incoming/outgoing information, a storage unit 8 storing programs for various functions, phone book data, transmission/reception messages or the like, a microphone 7 for inputting voice during voice communication, a speaker 6 for outputting voice during voice communication, and a CPU 5 for controlling various functions and operations of the mobile phone.

With the above construction, when receiving an incoming call, the mobile phone recognizes a caller's phone number, compares it with phone numbers registered with a phone book stored in itself, and if the phone book has a number that is identical with the caller's phone number, it displays a name corresponding to the detected number as the caller's name on the display unit 9. It should be noted here that the condition "the phone book has a number that is identical with the caller's phone number" is satisfied when either the caller's phone number is perfectly identical with a number in the phone book, or partly identical.

There is a known apparatus that stores, in the phone book in the storage unit 8, caller's names and phone numbers in a manner that correspondences between them are indicated, or, as disclosed in the U.S. Pat. No. 5,907,604, an apparatus that stores face pictures and caller's phone numbers and caller's names in a manner that correspondences between them are indicated.

The U.S. Pat. No. 5,907,604 discloses a technique in which when receiving an incoming call, a mobile phone searches the phone book for an image that corresponds to a caller's phone number and display a retrieved image on a display. This technique relates to a videoconference system. With this technique, when receiving from someone a request to participate the videoconference or an incoming call, the system displays a face picture of the person on a display so that the participant can decide whether to make a response to the person. If the participant decide not to make a response, the face picture disappears and never be displayed again.

On the other hand, in the case of a mobile phone, if the mobile phone user fails to respond to an incoming call for some reason, the user can see information concerning the not-responded call by displaying an incoming call history list which is a list of incoming calls the mobile phone received in the past, where each item of the list indicates whether a response has been made or not to an incoming call. FIG. 11 shows an example of the incoming call history list displayed on the screen. As shown in FIG. 11, each item of the list includes an incoming date and time, a caller's name (if the caller has not been registered with the phone book, a caller's phone number instead), and indication of whether a response has been made to the incoming call or not. There is another type of mobile phone that displays only the number of incoming calls the mobile phone received in the past and not responded, instead of the incoming call history list.

It should be noted here that the caller's number is a phone number that is sent from the caller's machine when the caller makes a call to the mobile phone. The user of the mobile phone can identify the caller by the phone number. This technique has already been adopted in many mobile phones, and is well known.

In the incoming call history list shown in FIG. 11, the incoming calls are arranged in the order of reception, and the most recently received call is displayed at the top of the list. The incoming call history list indicates that there are 10 incoming calls to which no response has been made, and the screen as the first page displays four pieces of information concerning recent four incoming calls which includes two responded incoming calls (incoming calls to which responses have been made) and two not-responded incoming calls (incoming calls to which no response has been made). The screen can be scrolled to display the next pages of the list. There are many scrolling methods depending on the types of mobile phones and any scrolling method will do. Note also that the number of pieces of information displayed on one screen for the list is not limited to four.

Some mobile phones provide a service called "call waiting". With this service, the user is notified of a new incoming call while talking with another caller, and can respond to the new call. For example, the base station transmits a signal indicating a new incoming call from a person B, to the mobile phone while the mobile phone user is talking with a person A. Receiving the signal, the mobile phone outputs a sound such as a beep pulse to notify the user of the new incoming call. When notified the new call, the user can respond to the new call to talk with the person B while putting the person A on hold, or disregard the new call. If a predetermined time period set in the base station passes without response to the new call, the base station terminates reception of the new call. Such a new incoming call may be connected to an answering service provided by the base station.

There is a further type of mobile phone which has a timer inside and if no response is made to such a new incoming call in the call waiting for a predetermined time period, it terminates reception of the new call.

Such incoming calls received during a conversation can be checked with the incoming call history list after the conversation is over.

As described above, with a conventional phone book function in a mobile phone in which caller's phone numbers, names, addresses, and/or images are stored in a manner correspondences between them are indicated, the user can display the incoming call history list to check the dates and times and names of the received calls to which no response has been made. However, it is impossible for the user to recognize only the not-responded calls immediately. This is because they are displayed together with the responded calls. Also, the incoming call history list is displayed only when the user presses a button for displaying the list, and is not displayed immediately after reception of the incoming call ends. As a result, the user cannot obtain information, such as the incoming time and the caller's name, of the most recent incoming call immediately after the reception of the incoming call ends.

Also, it often happens that the user cannot recall the face of a caller even if he/she knows the caller's name. This indicates that sometimes only the caller's name is not enough for the user to recognize completely who has made him/her a call. Accordingly, for the mobile phone user, display of the incoming call history list that contains only the caller's phone numbers and names is not satisfactory.

It should be noted here that in the present document, "responded" indicates that the user talked with a caller, namely the phone was "off the hook"; and "not-responded" indicates that the user did not talk with a caller, namely "on the hook", which may happen if, for example, the user disregards the incoming call, the user does not recognize the incoming call, the incoming call is recorded by the answering function of the terminal, the incoming call is connected to the answering service provided by the base station, or the incoming call is received in the call waiting.

SUMMARY OF THE INVENTION

The first object of the present invention is therefore to provide a communication apparatus which provides the user with information, such as the incoming time and the caller's name, of an incoming call to which no response has been made, immediately after reception of the incoming call ends.

The second object of the present invention is to provide a communication apparatus which immediately after it receives an incoming call, provides the user with reliable information to identify the caller.

The above first object is fulfilled by a communication apparatus comprising: a reception unit operable to receive incoming signals and obtain pieces of originator ID information from the received incoming signals, the pieces of originator ID information respectively identifying originators of the received incoming signals; an ID information storage unit operable to store the obtained originator ID information in a state that it is distinguishable for each piece of originator ID information whether a response has been made to an incoming signal from which the piece of originator ID information was obtained; and a not-responded signal notification unit operable to display notification information relating to originators of incoming signals to which no response has been made, the notification information being generated in accordance with originator ID information obtained from the incoming signals to which no response has been made.

With the above-described construction, only not-responded incoming calls are displayed, enabling the user to recognize only the not-responded incoming calls immediately. In a conventional incoming call history list, both responded and not-responded incoming calls are displayed together.

In the above communication apparatus, the not-responded signal notification unit may display the notification information when reception of a currently received incoming signal ends without a response being made thereto.

With the above-described construction, the user is provided with information, such as the incoming time and the caller's name etc., of a not-responded incoming call immediately after the reception of the incoming call ends. This information is automatically displayed, and the user need not press a button for an incoming call history list.

In the above communication apparatus, the not-responded signal notification unit may display the notification information for a predetermined time period.

The above first and second objects are also fulfilled by a communication apparatus comprising: a reception unit operable to receive an incoming signal and obtain originator ID information from the received incoming signal, the originator ID information identifying an origin at or of the received incoming signal; and a notification unit operable to display image data relating to the originator after reception of the incoming signal ends, the image data being generated in accordance with originator ID information obtained from the received incoming signal.

With the above-described construction, the user can check all incoming calls received in the past by images relating to the calls irrespective of whether they are responded or not-responded. This eliminates inconveniences in conventional techniques (a) that an image of a caller is displayed only when the incoming call is received, and (b) that the user can only see the name or phone number of a caller after reception of the incoming call ends.

The above communication apparatus may further comprise: a storage unit operable to store pieces of information relating to the originators of the received incoming signals as the notification information in a manner that correspondences between the pieces of information and the pieces of originator ID information are indicated, wherein when receiving a piece of originator ID information, the not-responded signal notification unit searches the storage unit in accordance with the received originator ID information and retrieves a piece of information relating to an originator of a received incoming signal, and displays the retrieved piece of information relating to the originator.

The above communication apparatus may further comprise: a storage unit operable to store pieces of image data relating to originators of received incoming signals in a manner that correspondences between the pieces of image data and the pieces of originator ID information are indicated, wherein when receiving a piece of originator ID information, the notification unit searches the storage unit in accordance with the received piece of originator ID information and retrieves and displays image data in accordance with the received piece of originator ID information.

In the above communication apparatus, the notification information may include at least image data that identifies the originator.

With the above-described construction, image data related to the caller is displayed. This enables the user to immediately recognize from whom the call was made.

In the above communication apparatus, when an incoming signal is received, a plurality of pieces of image data relating to an originator of the received incoming signal may be displayed one by one.

With the above-described construction, not a fixed image but a plurality of images are displayed in relation to a caller, making it easier for the user to identify the caller.

The above communication apparatus may further comprise: a storage unit operable to store pieces of image data relating to originators of received incoming signals in a manner that correspondences between the pieces of image data and obtained pieces of originator ID information are indicated, wherein the pieces of image data stored in the storage unit are displayed in a manner that displayed image data is switched from one to another.

The above communication apparatus may further comprise an incoming notification unit operable to, immediately after an incoming signal is received, display notification information and image data relating to an originator of the received incoming signal.

In the above communication apparatus, each piece of originator ID information may be a phone number, an address, or an identification number uniquely assigned to a communication apparatus.

In the above communication apparatus, when no response is made to an incoming signal for a predetermined time period, reception of the incoming signal may be terminated by a relay apparatus with which the communication apparatus is communicating.

In the above communication apparatus, when no response is made to an incoming signal for a predetermined time period, reception of the incoming signal may be terminated automatically.

In the above communication apparatus, each of the not-responded signal notification unit and the notification unit may display a not-responded signals list which is composed of one or more pieces of originator ID information obtained from incoming signals to which no response has been made.

With the above-described construction, only not-responded incoming calls are displayed, enabling the user to recognize only the not-responded incoming calls immediately. In a conventional incoming call history list, both responded and not-responded incoming calls are displayed together.

In the above communication apparatus, each piece of originator ID information in the not-responded signals list may include any combination of an incoming time, a name unique to an originator, and ID information unique to the originator.

The above communication apparatus may further comprise a screen display switching unit operable to, if the communication apparatus has been set to a sleep mode in which no operation to emit radio waves is available, immediately after the not-responded signal notification unit or the notification unit displays a screen, switch from the displayed screen to a screen indicating that the communication apparatus is in the sleep mode, wherein thereafter, with an arbitrary operation, the screen from the not-responded signal notification unit or the notification unit is displayed.

The above communication apparatus may further comprise a screen display switching unit operable to display a screen from the not-responded signal notification unit or the notification unit if the communication apparatus is set to a locked mode in which an operation is available, and display a not-responded signals list which is composed of pieces of information obtained from incoming signals to which no response has been made if the locked mode is cancelled.

The above communication apparatus may further comprise an originating unit operable to refer to the not-responded signals list to select one among the incoming signals to which no response has been made, and originate a signal to an originator of the selected incoming signal.

The above communication apparatus may further comprise: a second reception unit operable to receive a second incoming signal from a second originator and obtain a piece of originator ID information from the second incoming signal while communicating with a first originator; a second ID information storage unit operable to store the piece of originator ID information obtained from the second incoming signal, in a state that it is distinguishable whether a response has been made to the second incoming signal; and a second not-responded signal notification unit operable to display notification information relating to the second originator after a communication with the first originator ends if no response has been made to the second incoming signal, the notification information relating to the second originator being generated in accordance with the piece of originator ID information obtained from the second incoming signal.

With the above-described construction, if the user receives a second call while talking with a caller of a first call and does not respond to the second call, the user can check information relating to the second call after the user ends the conversation. Furthermore, only not-responded incoming calls are displayed, enabling the user to recognize only the not-responded incoming calls immediately. In a conventional incoming call history list, both responded and not-responded incoming calls are displayed together.

The above communication apparatus may further comprise a communication switching unit operable to, if a second incoming signal is received from a second originator while communicating with a first originator, put the first originator on hold and start communicating with the second originator if a predetermined operation is performed, then resume communication with the first originator and put the second originator on hold if another predetermined operation is performed.

In the above communication apparatus, the notification information relating to the second originator may include at least image data that identifies the second originator.

With the above-described construction, the user can immediately recognize from whom the second call was made by checking the displayed image data relating to the caller.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 5 shows the construction of a missed calls list;

FIG. 7 shows how the call waiting is dealt with;

DESCRIPTION OF THE PREFERRED EMBODIMENT

The following describes an embodiment of the present invention with reference to the attached drawings.

Figure 9:
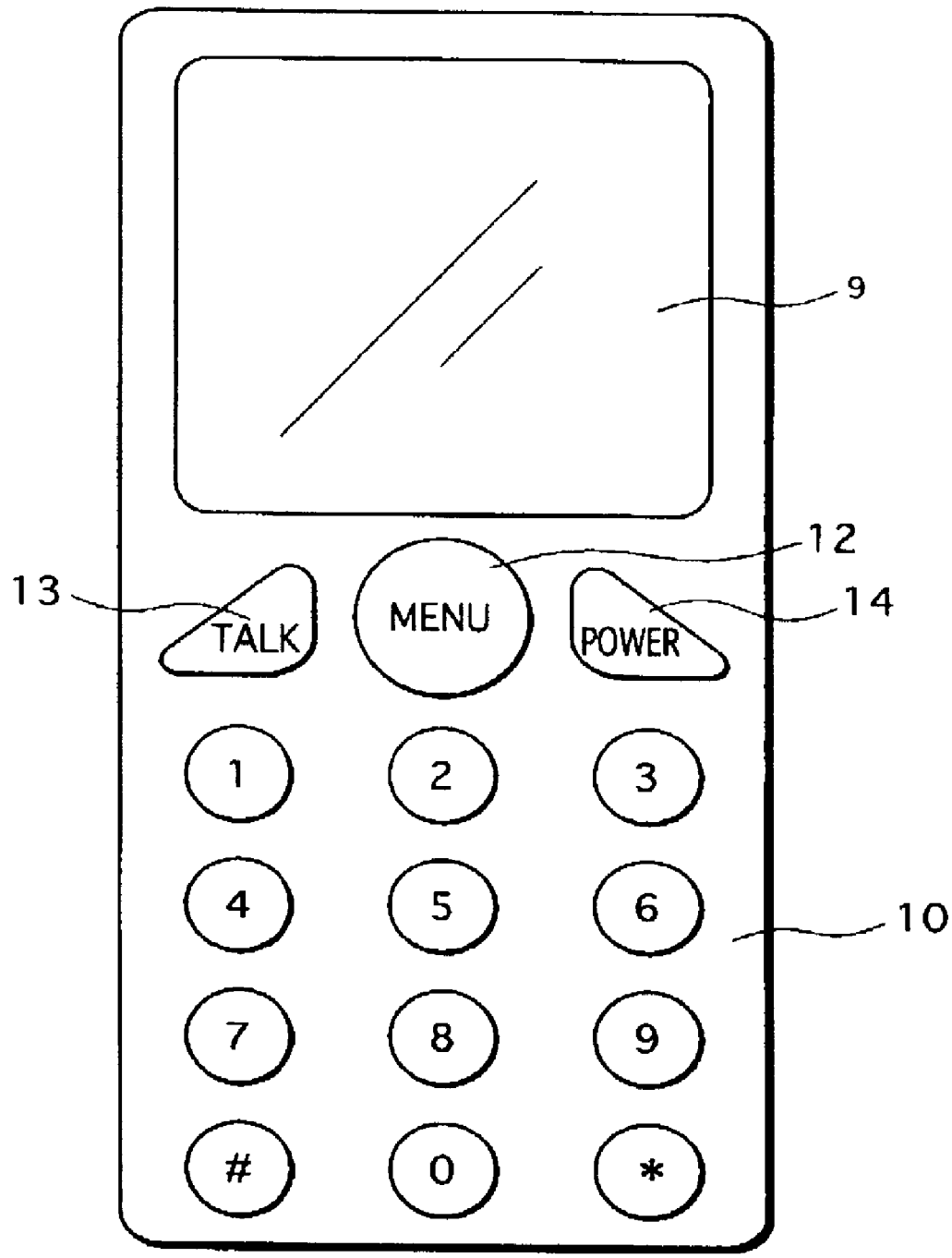
FIG. 9 shows the appearance of a mobile phone.
Figure 10:
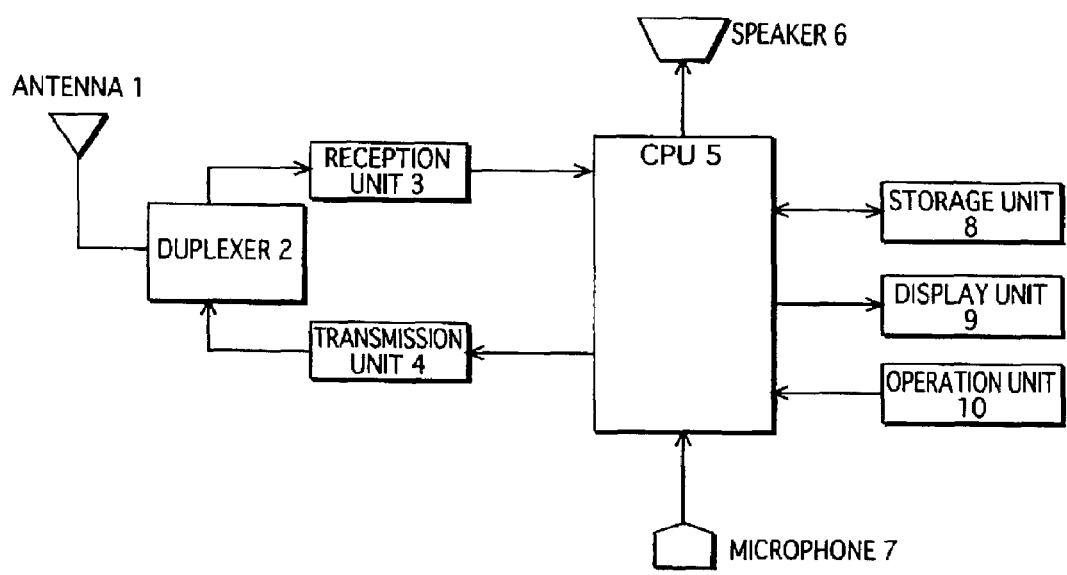
FIG. 10 is a block diagram showing the construction of the conventional mobile phone.
Figure 11:
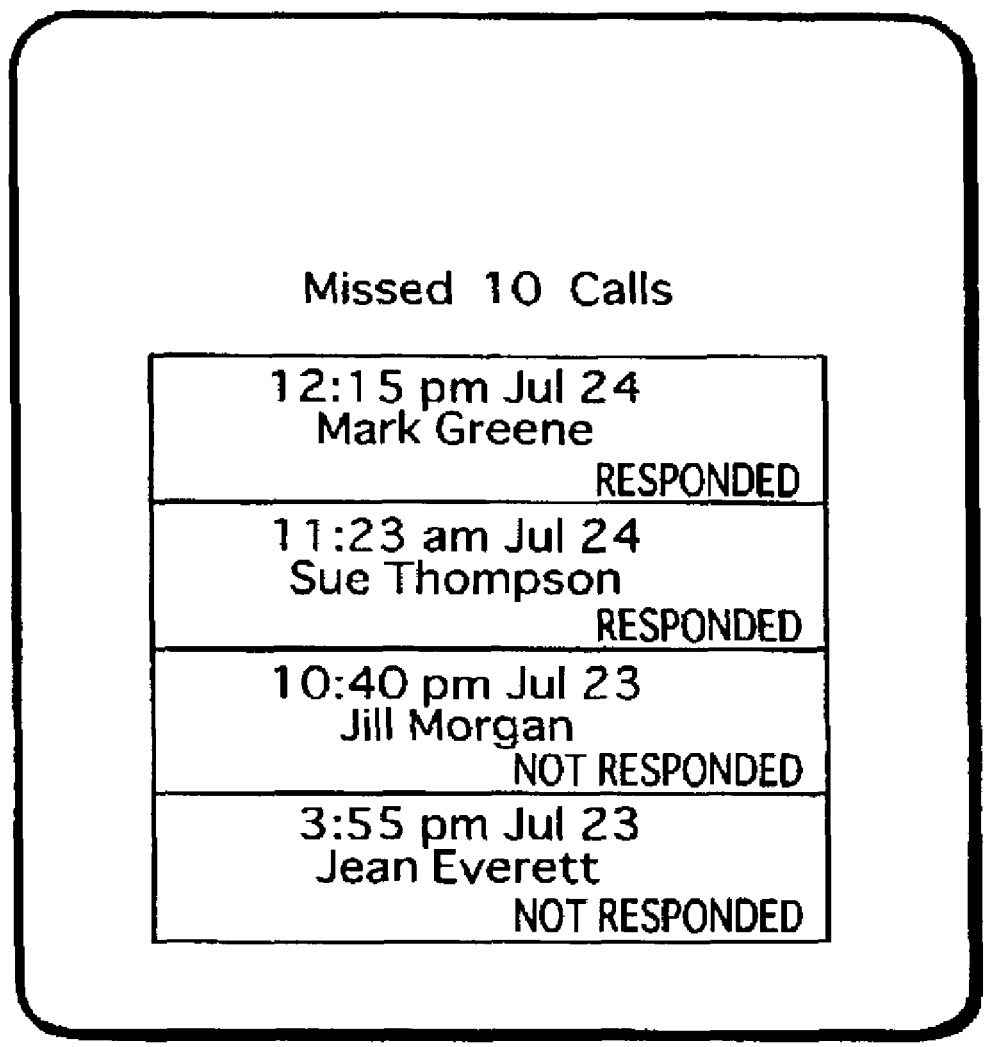
FIG. 11 shows an example of the incoming call history list screen.

The mobile phone of the present invention appears the same as the conventional mobile phone, and has the construction as shown in FIG. 9.

Figure 1:
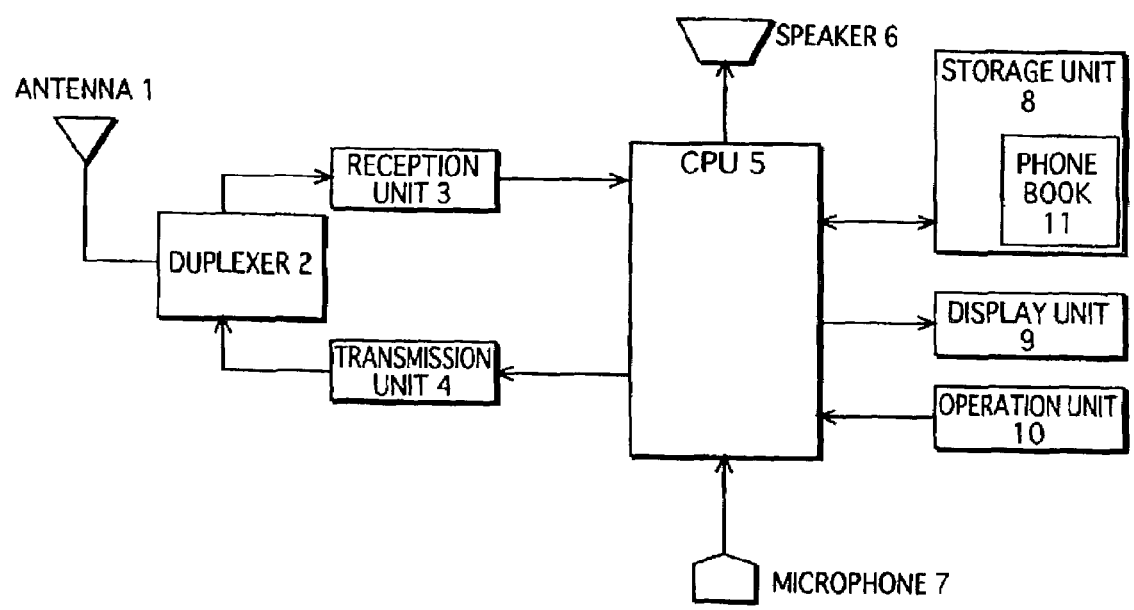
FIG. 1 is a block diagram showing the construction of the mobile phone of the present invention.

FIG. 1 is a block diagram showing the construction of the mobile phone of the present invention. The hardware construction is similar to that of the conventional mobile phone. Accordingly, the portions specifically unique to the present invention will be described here.

The storage unit 8 stores a phone book 11. The phone book 11 contains data shown in FIG. 2, for example. That is to say, the phone book 11 contains names, phone numbers, and image data indicating the correspondence between them, where the image data is identified by the image data file names such as MG, ST, JM, and JE.

The image data may be in any format in so far as the mobile phone can deal with it.

Figure 2:
FIG. 2 shows the construction of the phone book.

In the above example, the phone book is in the format shown in FIG. 2. However, the phone book may be in any format in so far as the phone book indicates correspondence between names, phone numbers, and image data.

Phone Book Data Registration

How to register the phone book data will be described.

Figure 3:
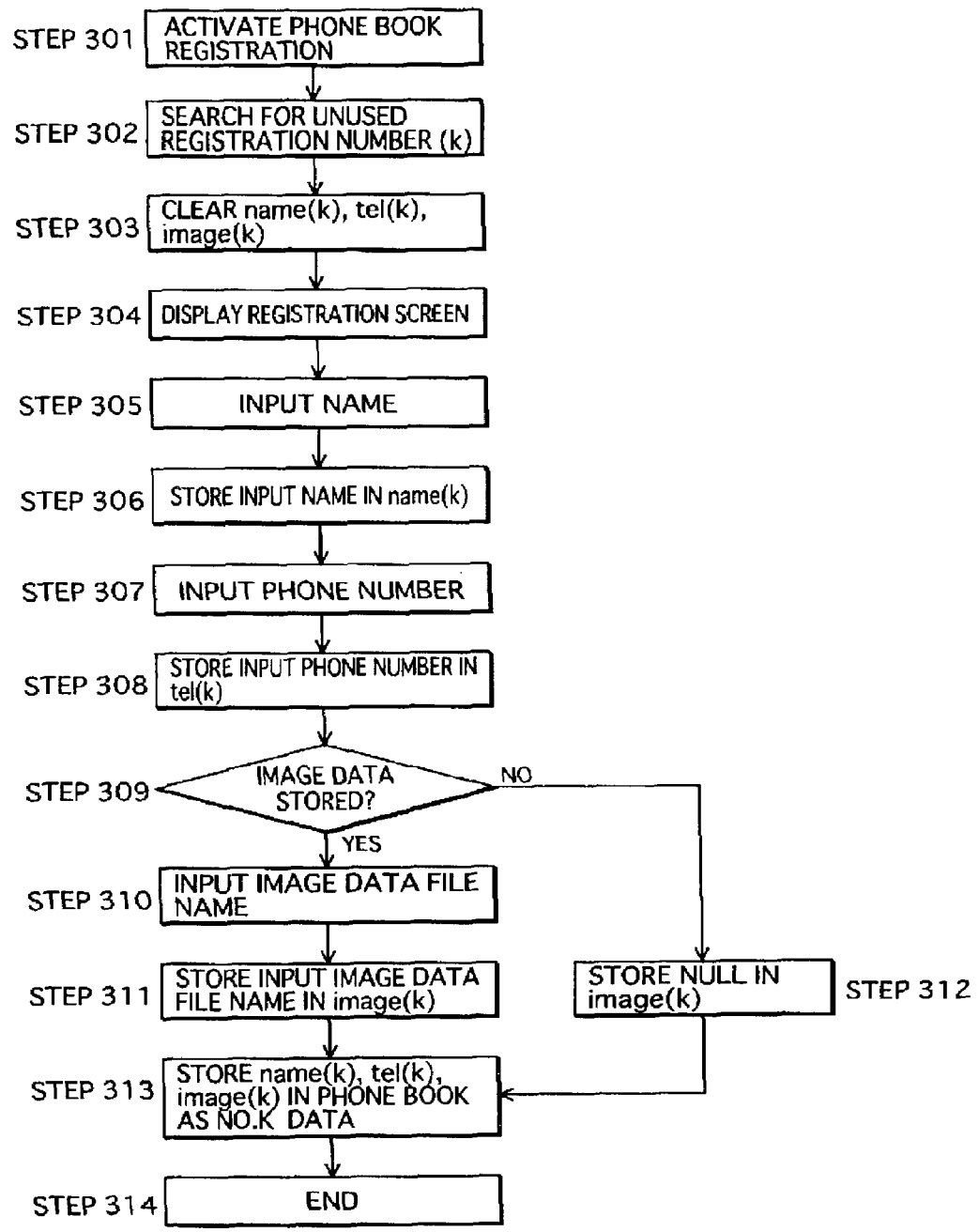
FIG. 3 is a flowchart showing how to register the phone book data.

The phone book data is registered by a conventional method such as the one shown in FIG. 3.

After the phone book registration function is activated (step 301), the CPU 5 searches the phone book for unused registration numbers (step 302). In doing this, the CPU 5 may search for the registration numbers in ascending order, or search starting with a number that follows a previously registered number. Any search method will do.

It is supposed here that the CPU 5 determines to use an unused registration number it detects first, and that the unused registration number the CPU 5 detects first is "k".

The CPU 5 then clears (resets) the parameters "name(k)", "tel(k)", and "image(k)" that contain data of a caller's name, a phone number, and an image data file name, respectively (step 303).

Here, more information will be given regarding step 303. There are various methods that can be used in step 302 to search for unused registration numbers. The following methods are examples of such, though not limited to those. The first method is to find a registration number k for which all of the "name(k)", "tel(k)", and "image(k)" are null. The second method is to find a registration number k for which either "name (k)" or "tel (k)" is null. The third method is to scan the flags attached to the registration numbers to find an unused registration number k, where the flags set to value "1" indicate "used", and the flags set to value "0" indicate "unused" or "deleted".

Here, when the first method is used, step 303 can be omitted because it is already known that all of the "name (k)", "tel (k)", and "image(k)" are null. However, step 303 is necessary when the second or third method is used.

The display unit 9 then displays the registration screen (step 304). A name is input first (step 305). The input name is stored in "name (k)" (step 306). After this, the screen changes to a screen for inputting a phone number, and the CPU receives input of a phone number (step 307). The input phone number is stored in "tel(k)" (step 308). After this, the screen changes to a screen for inputting an image data file name.

Here, the storage unit 8 may store image data in advance. There are many ways to input and store image data into the storage unit 8. For example, (a) a person who is to be registered with the phone book may transmit the image data to the mobile phone, (b) data of a picture taken by a camera separated from the mobile phone maybe captured into the storage unit via a personal computer or the like, or (c) a picture taken by a camera attached to the mobile phone may be stored into the storage unit.

In step 309, it is judged whether the storage unit 8 has image data. If it is judged positively, an image data file name is input in the screen for inputting an image data file name (step 310), and the input file name is stored in "image(k)" (step 311).

If it is judged negatively in step 309, "image(k)"is filled with null, which indicates that "image(k)" has no image data (step 312).

In step 313, the "name (k)", "tel(k)", and "image(k)" are stored in the storage unit 8 as phone book data, as shown in FIG. 2.

In the above example, a phone number is used to identify a caller. Not limited to this, another kind of ID data such as an address or an identification number unique to each communication apparatus may be used.

Also, the method of registration with the phone book is not limited to the above method, and any method may be used in so far as a caller's name, an ID (a phone number or an address) of the caller, and image data are registered together with the correspondence between them.

Incoming Call Notification

Now, an operation of the mobile phone of the present invention when it receives an incoming call will be described with reference to FIG. 1. The mobile phone receives a radio signal via the antenna 1. The received signal (an incoming call signal that is a call signal transmitted from the base station) is sent to the duplexer 2. The duplexer 2 transfers the received signal to the reception unit 3. The reception unit 3 checks whether the destination of the received signal is the phone number of the mobile phone itself. More specifically, the reception unit 3 checks whether a call destination number or a call destination address contained in the received signal is identical with the ID (a phone number, an address or the like) of the mobile phone itself. Any known technique may be used as the method for checking the destination of the received signal, and is not described in detail here. If it is confirmed that the destination of the received signal is identical with the ID of the mobile phone itself, the signal is demodulated; and if it is not identical, no operation is performed for the signal.

The demodulation method conforms to a modulation method such as QPSK used in mobile phones. However, the demodulation method is not limited to QPSK, but may be any method. Also, the demodulation method should agree with the communication method (for example, CDMA or TDMA). Note here that any communication method is applicable to the present invention.

The CPU 5 performs incoming call notification by controlling a notification unit using the display unit of the mobile phone. In performing the incoming call notification, the CPU 5 identifies the caller by checking whether the received signal contains information that identifies the caller, such as a caller's phone number or an address. If the received signal contains a phone number, the CPU 5 checks whether the phone number is registered with the phone book 11. It should be noted here that the method of identifying the caller is not limited to the phone number, but any ID information may be used in so far as it can identify the caller. This depends on the system construction of a product in which the present invention is mounted.

Figure 4:
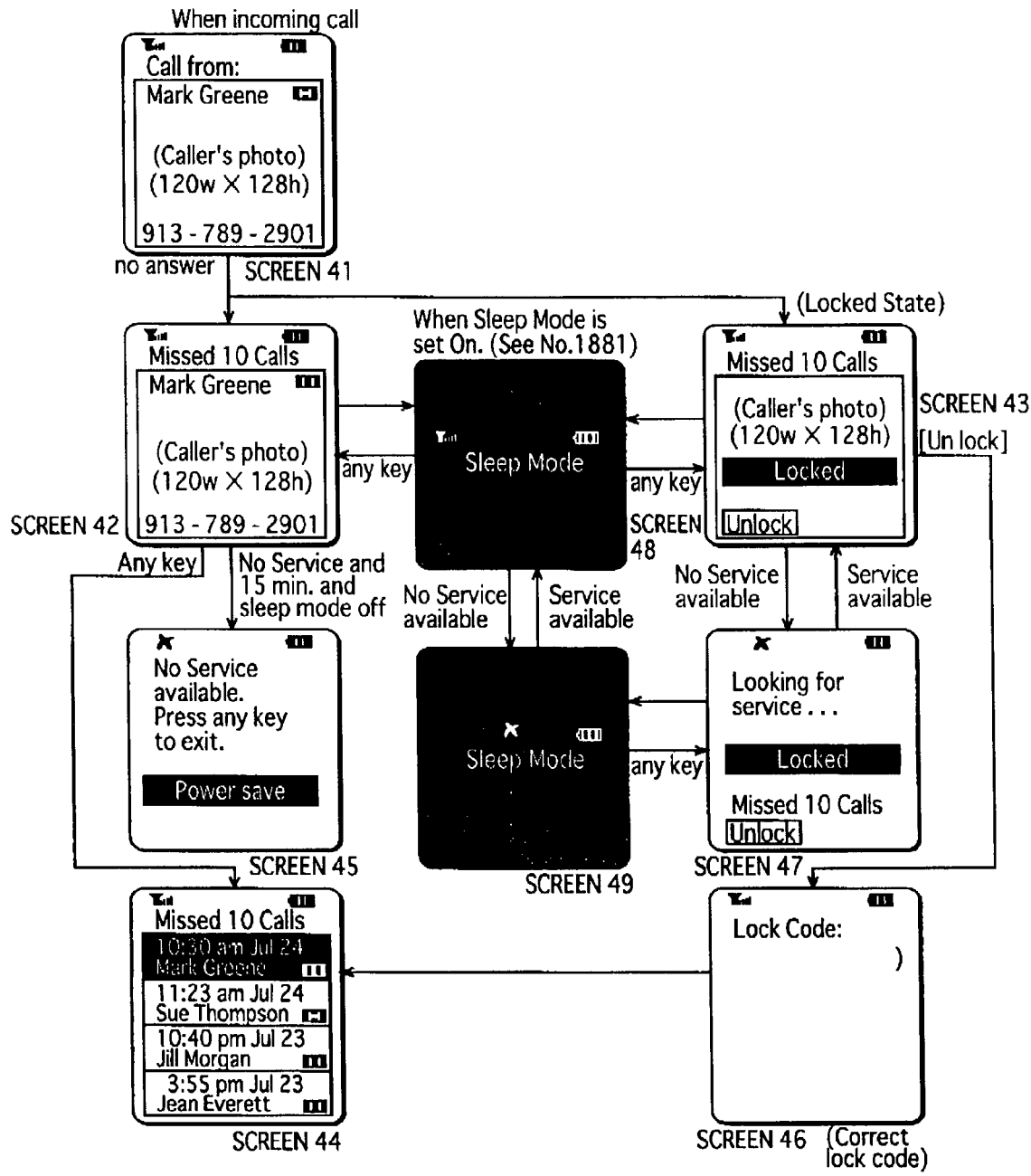
FIG. 4 shows transition of the missed call screen in the embodiment.

The CPU 5 displays the caller's name, phone number, and image data on the display unit 5 as shown in Screen 41 in FIG. 4 if the caller's phone number, name, and image data are registered with the phone book and the Picture Ringer function has been activated (ON). In this way, when the mobile phone receives an incoming call, the mobile phone notifies the user of the incoming call by displaying information (such as the caller's name, phone number, and image data) that is stored in the storage unit and identifies the caller, on the display unit.

It should be noted here that the Picture Ringer function is a function to display an image of a caller or the missed call screen, which will be described later, when an incoming call is received. Here, no image is displayed when the storage unit does not store image data corresponding to the caller or when the Picture Ringer function has not been activated (OFF).

The image to be displayed may be any kind of image in so far as the image is used to identify the caller. For example, the image may be a face picture of the caller, or an image that indicates a group (family, company, etc.) to which the caller belongs.

Also, the display of the image may be combined with other incoming call notification methods such as outputting of a ringer sound and vibration of a vibrator.

When notified of an incoming call, the mobile phone user determines whether to respond to the call by checking the information displayed on the display unit 9 concerning the caller.

When the user does not respond to the incoming call, the information obtained from the incoming call (hereinafter this information is referred to as caller information) is stored in the storage unit 8. For example, such information may be stored in the storage unit as a missed calls list shown in FIG. 5. Each piece of information (caller information) in the list includes ID information of the caller (for example, a phone number) and the incoming time. The CPU 5 determines, for each incoming call, whether the user has responded to the call or not, and stores the caller information in the storage unit, distinguishing caller information of responded calls from caller information of missed (not-responded) calls. The CPU 5 generates the missed calls list by reading only the caller information of missed calls from the storage unit. Whether the user has responded to an incoming call is determined by checking whether the TALK key was pressed during a predetermined time period for an incoming call. The incoming time is provided by the clock function of the CPU 5. The clock function of the mobile phone is known and is not described here.

Reference numbers are assigned to pieces of caller information as shown in FIG. 5, where the more recent the call is, the smaller the reference number assigned to the call is. As a result, reference number "1" is assigned to an incoming call that was received at 17:01 on Apr. 4, 2001 and is the most recent.

It should be noted here that not limited to the above order, the reference numbers may be assigned to the incoming calls in any order.

Missed Call Screen

Now, how to notify the user of a missed call will be described.

Screens to be displayed on the display unit 9 will be described first with reference to FIG. 4. When an incoming call is received, the caller's name, phone number, and if the Picture Ringer function is ON, image data are displayed as shown in Screen 41 in FIG. 4. This operation has already been described.

Meanwhile, it sometimes happens that the user does not respond to an incoming call due to the unwillingness of the user, or cannot respond to the call because he/she is attending a meeting or driving a car, or because the user is using another function (such as a function to create a mail) of the mobile phone. Generally, when the user does not respond in a predetermined time period (for example, 30 seconds), the base station ends the call. If the base station provides an answering service, the caller may leave a message in a memory in the base station, and the user of the mobile phone may be able to listen to the message, later. Otherwise, the caller disconnects the phone. Alternatively, if the mobile phone has a timer, the mobile phone may be set to automatically disconnect a call after a predetermined time period (for example, 30 seconds) has passed.

When an incoming call ends without being responded and entering a conversation, the incoming call notification screen 41 shown in FIG. 4 changes to a missed call screen 42 or 43. When the mobile phone is set to a locked state, the screen changes to the missed screen 43 in which an image of the most recent caller and the number of missed calls are displayed, indicating that the mobile phone is set to the locked state. When the mobile phone is not set to the locked state, the screen changes to the missed screen 42 in which an image, name and phone number of the most recent caller and the number of missed calls are displayed.

It should be noted here that the mobile phone can be set to the locked state if the user does not want the mobile phone to be used by other people. In the locked state, the keys on the mobile phone are not available unless a secret number called a lock code is input.

In displaying the missed call screen, the phone book 11 is searched for the caller's name, and if the Picture Ringer function is ON, image data based on the ID information such as the caller's phone number obtained at the reception of the call, and the detected name and image are displayed on the display unit 9.

Next, the operation of the mobile phone will be described for each different setting of the function modes. The setting can be done by operating keys such as the menu key 12. Explanation will be provided in terms of various combinations of the following function modes: Picture Ringer that is uniquely provided by the present invention; Locked State that invalidates all key operations until the state is cancelled; and Sleep Mode that prohibits signal transmission, to avoid automatically starting to work in a flying airplane, for example (in some modes, automatic restarting can happen).

(a) Case 1
  Picture Ringer: ON
  Locked State: OFF
  Sleep Mode: OFF
  When any key is operated in the screen 42, the screen changes to the missed calls list screen 44 that shows a list of missed calls together with incoming times and caller's names or phone numbers.

(b) Case 2
  Picture Ringer: OFF
  Locked State: OFF
  Sleep Mode: OFF
  After the screen 42 is displayed for 15 minutes, the screen changes to the power-save screen 45, which is done to save power since a long display of a screen consumes much power supplied from the battery. The power save function may be a conventional one.

(c) Case 3
  Picture Ringer: ON
  Locked State: ON
  Sleep Mode: OFF
  When the unlock operation is performed (for example, by selecting a soft button) in the screen 43 which is in the locked state, the screen changes to the screen 46, which is a lock code input screen. Here, if a correct lock code is input, the locked state is cancelled and the screen changes to the missed calls list screen 44. Note that the lock code is used to cancel the locked state.

(d) Case 4
  Picture Ringer: OFF
  Locked State: ON
  Sleep Mode: OFF
  After the screen 43 is displayed, the screen changes to the screen 47 to show that the mobile phone is in the locked state and that the Picture Ringer function is not available. However, if the Picture Ringer function is activated in the screen 47, the screen returns to the screen 43.

(e) Case 5
  Picture Ringer: ON
  Locked State: OFF
  Sleep Mode: ON
  Immediately after the screen 42 is displayed, the screen changes to the screen 48 that indicates that the mobile phone is in the sleep mode. When any key is operated in the screen 48, the screen returns to the screen 42.

(f) Case 6
  Picture Ringer: ON
  Locked State: ON
  Sleep Mode: ON

Immediately after the screen 43 is displayed, the screen changes to the screen 48 that indicates that the mobile phone is in the sleep mode. When any key is operated in the screen 48, the screen returns to the screen 43.

(g) Case 7
  Picture Ringer: OFF
  Locked State: ON
  Sleep Mode: ON
  Immediately after the screen 43 is displayed, the screen changes to the screen 47, then immediately to the screen 49 that indicates that the mobile phone is in the sleep mode. When any key is operated in the screen 49, the screen returns to the screen 47. When the Picture Ringer function is activated in the screen 49, the screen changes to the screen 48.

Figure 6:
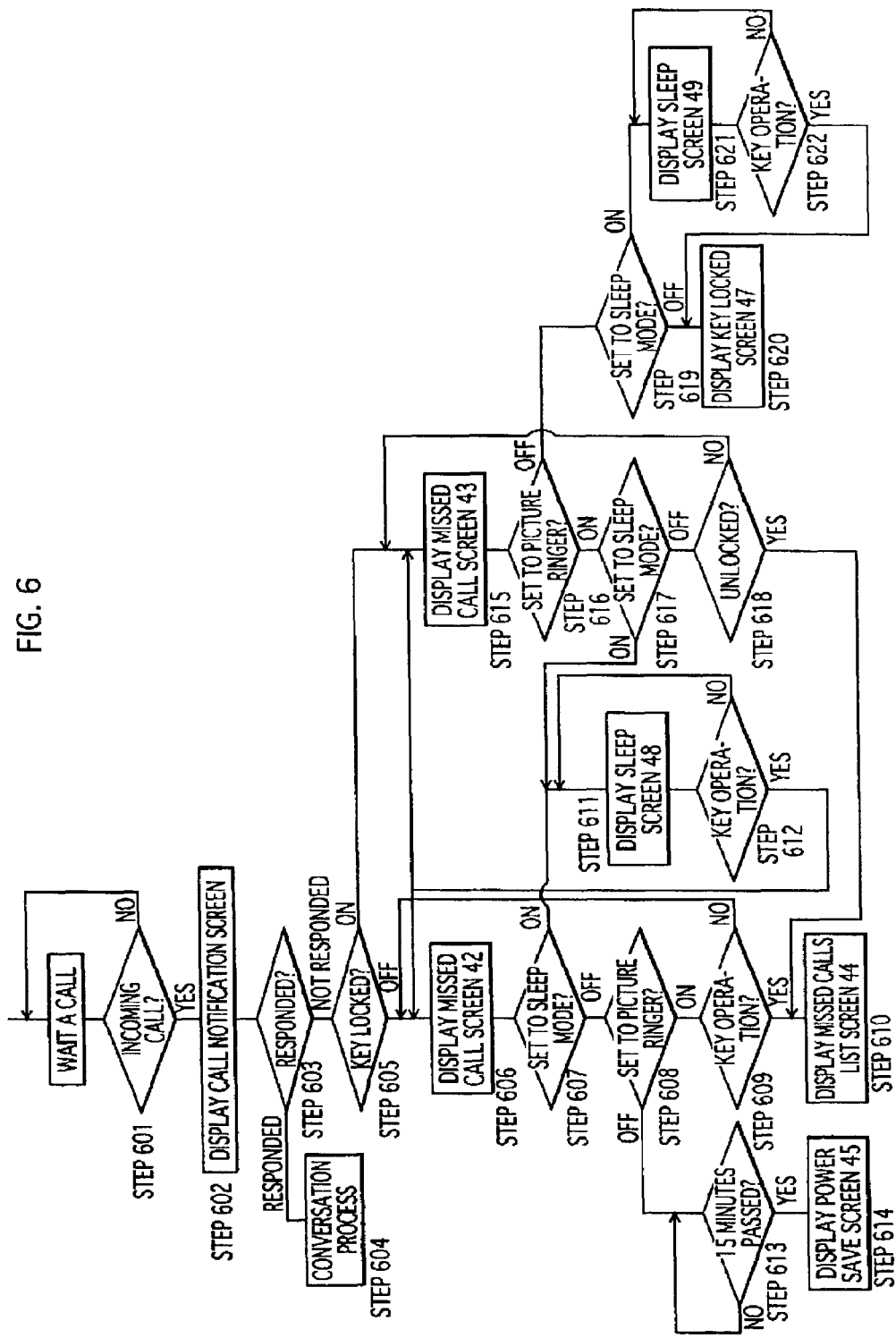
FIG. 6 is a flow chart for the embodiment of the present invention.

The above operations will be described with reference to the flow chart shown in FIG. 6.

It is intermittently checked whether an incoming call has been received (step 601) during the waiting operation. When an incoming call is received, the incoming call notification screen such as the screen 41 is displayed (step 602). If a response is made to the received incoming call (judged as "Responded" in step 603), a conversation with the caller is performed (step 604). If no response is made to the received incoming call (judged as "Not Responded" in step 603), it is judged whether the mobile phone is set to the locked state (step 605). If the judgment result is negative (judged as "Off" in step 605), the missed call screen (screen 42) is displayed (step 606).

Here, the judgment in step 603 is made by the CPU. The judgment process will be described in more detail. For this judgment, the CPU judges whether the phone was "off the hook" (the phone communicated with the caller). If the phone has never been off the hook (has been on the hook), the CPU judges that no response has been made to the incoming call. Such a judgment will be made if, for example, the user disregards the incoming call, the user does not recognize the incoming call, or the incoming call is connected to the answering service provided by the base station.

For this judgment, the CPU also checks the answering function of the mobile phone. More specifically, if the phone was off the hook and the answering function was activated, the CPU makes a judgment that no response has been made to the incoming call. Activation of the answering function can be checked by, for example, a flag that is attached to the history data of the incoming call to indicate whether the answering function was activated, and is recorded in the incoming call history data. As a result, only if the phone was off the hook and the answering function was not activated, the CPU makes a judgment that a response has been made to the incoming call.

Then, in step 607, it is judged whether the mobile phone is set to the sleep mode. If the judgment result is positive (judged as "ON" in step 607), the screen is switched to the sleep screen (screen 48) (step 611). If any key operation is performed while the sleep screen is displayed (judged as "YES" in step 612), the screen returns to the missed call screen (screen 42) (step 606). If it is judged that any key operation has not been performed (judged as "NO" in step 612), the sleep screen (screen 48) continues to be displayed (step 611).

If it is judged that the mobile phone is not set to the sleep mode (judged as "OFF" in step 607), it is judged whether the mobile phone is set to the Picture Ringer (step 608). If the judgment result is positive (judged as "ON" in step 608), it is judged whether any key operation has been performed (step 609). Alternatively, if the judgment result of step 608 is positive (judged as "ON" in step 608), the missed call screen (screen 42) continues to be displayed (step 606), or the missed call screen returns to the waiting screen after the missed call screen is displayed for a predetermined period. If the judgment result is positive (judged as "YES" in step 609), the missed calls list screen (screen 44) is displayed (step 610). If it is judged that the mobile phone is not set to the Picture Ringer (judged as "OFF" in step 608), it is judged based on the timer whether a certain time period (in this example, 15 minutes) has passed (step 613). If the judgment result is positive (judged as "YES" in step 613), the screen is switched to the power save screen (screen 45) (step 614).

If it is judged that the mobile phone is locked (set to the locked state) in step 605, the missed call screen (screen 43) is displayed (step 615). Then, it is judged in step 616 whether the mobile phone is set to the Picture Ringer (step 616). If the judgment result is positive (judged as "ON" in step 616), it is judged whether the mobile phone is set to the sleep mode (step 617). If the judgment result is negative (judged as "OFF" in step 617), it is judged whether the mobile phone is unlocked (the locked state has been cancelled) (step 618) If the judgment result is negative (judged as "NO" in step 618), the missed call screen (screen 43) continues to be displayed (step 615). If it is judged that the mobile phone is unlocked (judged as "YES" in step 618), the missed calls list screen (screen 44) is displayed (step 610).

It should he noted here that any key operation may be used to unlock the mobile phone. For example, a general method is that an unlock key dedicated to the unlocking operation is pressed first, then a lock code is input. The unlock key may be achieved on a touch panel displayed on the display unit 9, or may be assigned to any key as a function key.

If it is confirmed that the mobile phone is set to the locked state, Picture Ringer, and sleep mode (judged as "ON" in each of steps 605, 616, and 617), the screen is switched from the missed call screen (screen 43) to the sleep screen (screen 48) (step 611). If any key operation is performed while the sleep screen is displayed (judged as "YES" in step 612), the screen returns to the missed call screen (screen 42) (step 606).

If it is judged in step 619 that the mobile phone is not set to the sleep mode (judged as "OFF" in step 619) (that means when the mobile phone is locked, but not set to Picture Ringer nor sleep mode), the screen is switched to the locked screen (screen 47) (step 620). If it is judged in step 619 that the mobile phone is set to the sleep mode (judged as "ON" in step 619), the sleep screen (screen 49) is displayed (step 621). If any key operation is performed while the sleep screen is displayed (judged as "YES" in step 622), the screen changes to the key locked screen (screen 47) (step 620).

Call Waiting

Figure 7:
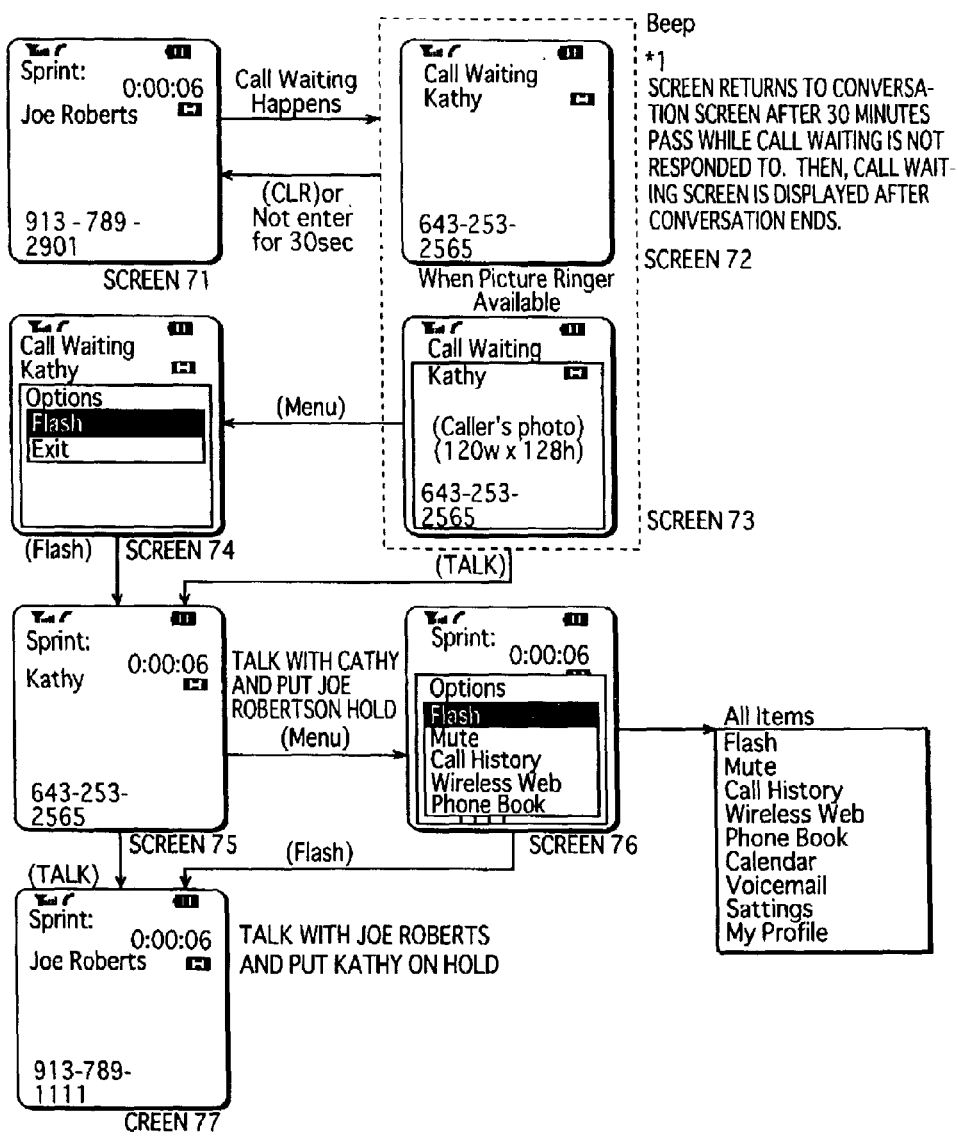

Now, how the present mobile phone deals with the call waiting will be described, with a specific example and with reference to FIG. 7 which corresponds to the specific example. Here, the call waiting refers to a state where the mobile phone receives an incoming call while the user is talking with another caller.

The mobile phone user is having conversation with Mr. Roberts. In this state, the mobile phone displays the screen 71 that contains the caller's name and phone number and the like. During the conversation with Mr. Roberts, the mobile phone receives a call from Ms. Kathy. This is a call waiting.

In such a case, the base station transmits a signal indicating the incoming call to the mobile phone. Receiving the signal, the mobile phone outputs a ringer tone intermittently. Typically, a beep is output from the speaker 6 instead of the ringer tone. A screen such as the screen 72 is also displayed to notify the user of the incoming call. In addition to these, in the present invention, when the mobile phone is set to Picture Ringer, instead of the screen 72 that shows the caller's name and phone number, the screen 73 is displayed. The screen 73 shows an image of Ms. Kathy and her phone number.

One way to respond to the incoming call from Ms. Kathy is to press the TALK key to talk with her, putting Mr. Roberts on hold. Alternatively, the user can press the MENU key 12 to display the screen 74 that shows selectable items under "Options", and select "Flash" so as to do the same, that is, to talk with her and put Mr. Roberts on hold.

When this course of action is selected, the display unit 9 displays the screen 75 which shows the name of the person on the other end (in this case, "Kathy") and in conversation with the user.

To resume the conversation with Mr. Roberts and put Ms. Kathy on hold, the user presses the TALK key 13. Alternatively, the user can press the MENU key 12 to display the screen 76 that shows selectable items under "Options", and select "Flash" so as to do the same, that is, to talk with him and put Ms. Kathy on hold.

When this course of action is selected, the display unit 9 displays the screen 77 which shows the name of the person on the other end (in this case, "Joe Roberts") and in conversation with the user.

Typically, if no response is made to the incoming call from Ms. Kathy in the call waiting for 30 seconds, the base station ends transmitting the incoming call signal to the mobile phone, and connects the call to the answering service. There are cases however, the base station does not provide such services. For fear of this, the mobile phone may be programmed to be on the hook (disconnect the call) automatically after a lapse of 30 seconds. Off course, Ms. Kathy herself may stop calling before 30 seconds pass.

If no response is made to an incoming call in the above call waiting, a missed call screen (which corresponds to the screen 42 and displays the name "Kathy", phone number, and image of the caller) is displayed when the mobile phone has been set to Picture Ringer function; and a missed calls list screen including the data relating to this incoming call is displayed when the mobile phone has not been set to Picture Ringer function.

As described above, the screen switches from one to another as shown in FIG. 4 if no response is made to an incoming call in a call waiting.

Figure 8:
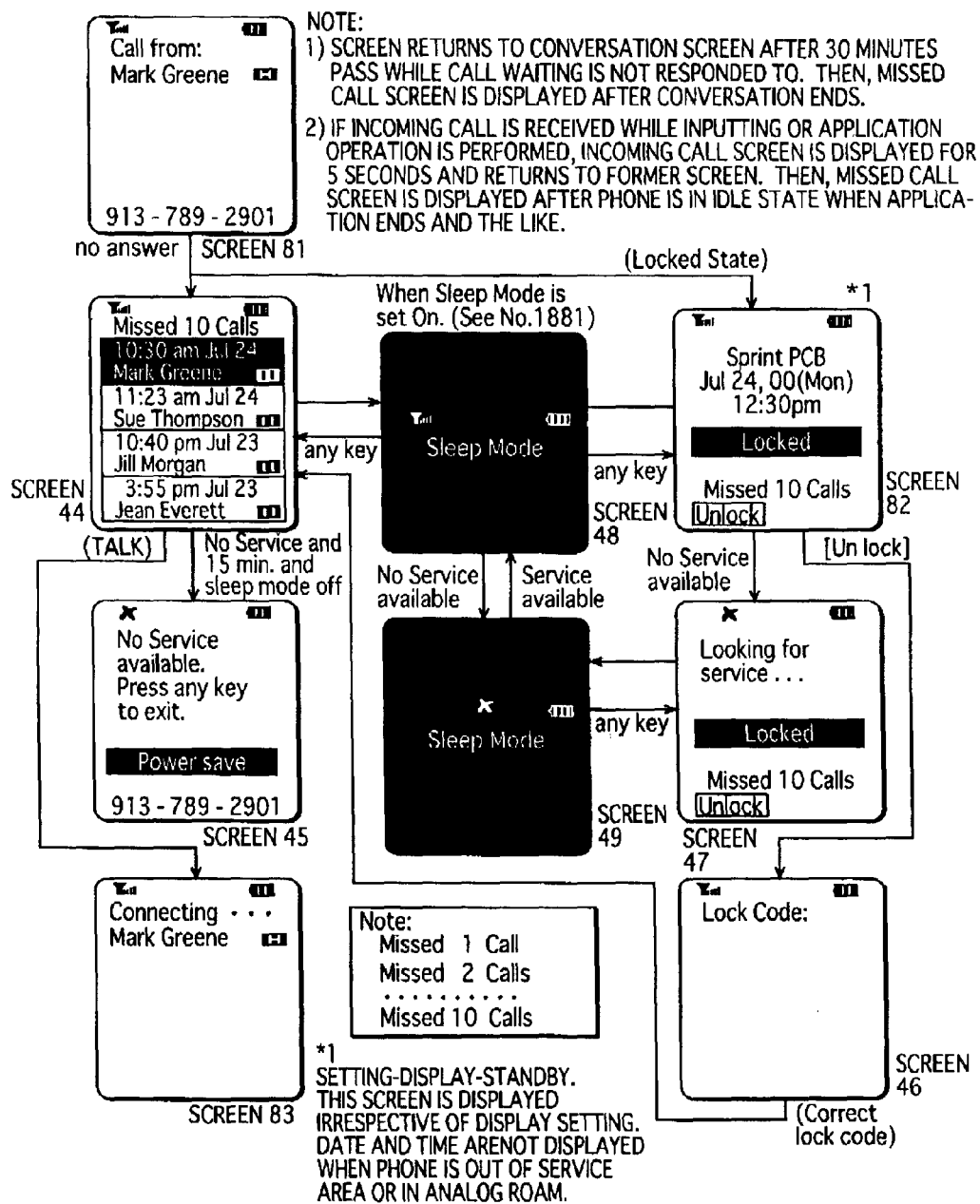
FIG. 8 shows how to originate a call from the missed calls list screen.

It is possible to originate a call from the missed calls list screen. The operation will be described with reference to FIG. 8. FIG. 8 shows how to originate a call from the missed calls list screen. FIG. 8 includes the same operation corresponding to the screen changes from screen 41 to screen 48, with the same numbering being used. Also, for the sake of convenience, the missed call screen 42 is omitted, and only the missed calls list screen 44 is shown. Similarly, the missed call screen 43 displayed when the mobile phone is locked is omitted, and the missed call screen 82 displayed when Picture Ringer is OFF is shown.

After the conversation indicated by the screen 81 ends, the user selects a desired missed call from the missed calls list screen 44, and presses the TALK key. With this operation, the mobile phone reads a destination from the phone book 11 and originates a call to the destination. The screen 83 indicates that the mobile phone is currently originating a call.

Others

1 In the above-described example, an image of the caller is displayed on the missed call screen. However, not limited to this, any image data may be used in so far as the user of the mobile phone can identify the caller from the displayed image.

For example, a plurality of pieces of image data for each caller may be stored in the storage unit, and when an incoming call is received, the plurality of pieces of image data relating to the caller of the received incoming call may be displayed one by one.

Also, the displayed image is not limited to a human, but may be a symbol, encrypted data, an animal or the like.

2 In the above-described example, functions to deal with not-responded calls are explained in terms of voice communications (conversations). However, not limited to voice communications, the present invention can be applied to data transmission such as mail transmission, for example. In the case of a mail transmission, each incoming mail can be treated the same as an incoming call, where a not-read mail is treated in a same manner as a not-responded call.

3 In the above-described example, it is explained that image data is displayed in correspondence with a not-responded incoming call. However, not limited to this, it is further possible that image data is displayed in correspondence with a responded incoming call. When this happens, image data identifying a caller is displayed each time an incoming call is received irrespective of whether a response is made to the incoming call or not.

4 The present invention enables a mobile phone to, it no response is made to an incoming call, display a missed call screen that contains information, especially image data, for identifying a caller of the incoming call. The present invention having such a feature eliminates an inconvenience in conventional techniques in which only the name and phone number of the caller are displayed if no response is made to an incoming call.

Also, conventionally, the mobile phone user can identify the caller only when the mobile phone receives an incoming call However, the present invention enables the mobile phone user to check each incoming call by images even after the reception of the incoming call ends, irrespective whether a response is made to the incoming call or not. The present invention having such a feature eliminates an inconvenience in conventional techniques in which only the name or phone number of the caller is displayed after the reception of the incoming call ends.

The present invention also enables the user to display a missed call screen to obtain information, especially image data, relating to incoming calls that was received in the call waiting and to which no response has been made. As a result, the mobile phone user can check, by images, all incoming calls including those received in the call waiting after the user ends a conversation. The present invention having such a feature eliminates an inconvenience in conventional techniques in which the mobile phone user checks such incoming calls only by the names or phone numbers of the callers.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile communication device comprising:
   a reception unit receiving incoming signals and obtaining pieces of originator ID information from the received incoming signals, the pieces of originator ID information respectively identifying originators of the received incoming signals;
   a judgment unit to judge, for each of the incoming signals received by the reception unit, whether, before reception of said each of the incoming signals ended, a response had been made to said incoming signal;
   an ID information storage unit storing the obtained originator ID information in a state, which corresponds to a result of a judgment made by the judgment unit, that is distinguishable for each piece of originator ID information whether a response has been made to said incoming signal from which the piece of originator ID information was obtained;
   an image storage unit storing photographic image data corresponding to the pieces of originator ID information respectively identifying originators of received incoming signals;
   a not-responded signal notification unit to display notification information for only missed calls after end of reception of the incoming signals of the missed calls, wherein the notification information to be displayed is read out from the ID information storage unit, and the missed calls are calls which ended without being responded to and entering a conversation; and
   a screen display unit, when an incoming call from an originator has ended without being responded to and without entering into a conversation, with a user of the device when the user is in an existing call displaying a number of the missed calls and a photographic image of the originator that corresponds to the originator ID information of the originator when the device is set to picture ringer function.

* * * * *